US012417727B2

(12) United States Patent
Charisoulis et al.

(10) Patent No.: US 12,417,727 B2
(45) Date of Patent: Sep. 16, 2025

(54) SUPER PIXEL ARCHITECTURE FOR HIGH DYNAMIC RANGE

(71) Applicant: Apple Inc., Cupertino, CA (US)

(72) Inventors: Thomas Charisoulis, San Carlos, CA (US); Saif Choudhary, San Jose, CA (US); Xia Li, San Jose, CA (US); Tore Nauta, Santa Cruz, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/853,261

(22) Filed: Jun. 29, 2022

(65) Prior Publication Data

US 2023/0091644 A1 Mar. 23, 2023

Related U.S. Application Data

(60) Provisional application No. 63/247,009, filed on Sep. 22, 2021.

(51) Int. Cl.
*G09G 3/3233* (2016.01)
*G09G 3/20* (2006.01)

(52) U.S. Cl.
CPC ......... *G09G 3/2074* (2013.01); *G09G 3/3233* (2013.01); *G09G 2300/0439* (2013.01); *G09G 2300/0842* (2013.01); *G09G 2320/0233* (2013.01)

(58) Field of Classification Search
CPC ............... G09G 3/2074; G09G 3/3233; G09G 2300/0439; G09G 2300/0842; G09G 2320/0233; G09G 2300/0443; G09G 2300/0814; G09G 3/32
See application file for complete search history.

(56) References Cited

U.S. PATENT DOCUMENTS

| | | | | |
|---|---|---|---|---|
| 2003/0030601 A1* | 2/2003 | Komiya | G09G 3/2074 | 345/76 |
| 2005/0104875 A1* | 5/2005 | Kwak | G09G 3/3233 | 345/204 |
| 2005/0200573 A1* | 9/2005 | Kwak | G09G 3/3233 | 345/76 |
| 2006/0061525 A1* | 3/2006 | Kim | H10K 59/131 | 345/76 |
| 2006/0114193 A1* | 6/2006 | Kwak | G09G 3/3233 | 345/76 |

(Continued)

OTHER PUBLICATIONS

Kong, Duk-Jo et al., "Color tunable monolithic InGaN/GaN LED having a multi-junction structure," Optics Express, vol. 24, No. 6, Mar. 17, 2016, pp. 1-8.

*Primary Examiner* — Jeff Piziali
(74) *Attorney, Agent, or Firm* — Fletcher Yoder, P.C.

(57) ABSTRACT

A display system of a display includes a first light emitting diode, a second light emitting diode, a current source, and at least one transistor. The first and the second light emitting diodes emit light. The current source provides a constant current to the first light emitting diode and the second light emitting diode. Moreover, the at least one transistor removes the current or shunts the current towards the first light emitting diode, the second light emitting diode, or both. Removing the current or shunting the current towards the first light emitting diode, the second light emitting diode, or both, may blend outputs of the first light emitting diode and the second light emitting diode.

11 Claims, 11 Drawing Sheets

(56) References Cited

U.S. PATENT DOCUMENTS

| | | | | |
|---|---|---|---|---|
| 2012/0133682 | A1* | 5/2012 | Kawano | G09G 3/3233 345/690 |
| 2015/0145906 | A1* | 5/2015 | Uetake | G09G 3/207 345/694 |
| 2016/0210892 | A1* | 7/2016 | Ohara | G09G 3/2022 |
| 2016/0307510 | A1* | 10/2016 | Duan | G09G 3/3258 |
| 2017/0039934 | A1* | 2/2017 | Ma | G09G 3/3233 |
| 2018/0053460 | A1* | 2/2018 | Watsuda | G09G 3/32 |
| 2019/0355301 | A1* | 11/2019 | Lee | G09G 3/3275 |
| 2019/0362667 | A1* | 11/2019 | Ma | G06V 40/1318 |
| 2020/0020274 | A1* | 1/2020 | Yue | G09G 3/32 |
| 2020/0135092 | A1* | 4/2020 | Ahmed | H01L 27/1214 |
| 2021/0335216 | A1* | 10/2021 | Nie | G09G 3/3233 |
| 2022/0293052 | A1* | 9/2022 | Lee | H01L 27/156 |
| 2023/0274696 | A1* | 8/2023 | Liu | H01L 27/156 345/212 |

* cited by examiner

SUPER PIXEL ARCHITECTURE FOR HIGH DYNAMIC RANGE

CROSS-REFERENCE TO RELATED APPLICATIONS

This application claims priority to U.S. Provisional Application No. 63/247,009, filed Sep. 22, 2021, entitled, "SUPER PIXEL ARCHITECTURE FOR HIGH DYNAMIC RANGE," the disclosure of which is incorporated by reference in its entirety for all purposes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates generally to systems and devices for light emitting diodes to operate at peak efficiency currents while also providing a high dynamic range.

In some embodiments, a super pixel may include multiple subpixels. The super pixel may be a symmetric super pixel that has symmetric subpixels, in which the areas and the dimensions (e.g., length and width) of the subpixels are the same. In some embodiments, the super pixel may be an asymmetric super pixel that has asymmetric subpixels, in which the areas and the dimensions of the subpixels are different. The subpixels may be turned on one by one or turned off one by one for granular control over brightness or dimming of the super pixel.

Moreover, the subpixels may be controlled individually to vary the amount of current going to each of the light emitting diodes for the subpixels. For example, a display system of a display may include one or more transistors (e.g., operating as switches) to remove current or shunt current from a current source providing constant current. In particular, removing and shunting the current may cause light emitting diodes for the subpixels to be partially on or off (e.g., not completely on or off or not completely illuminating or not illuminating). Also, removing the current or shunting the current towards the light emitting diodes for the subpixels may blend outputs of the light emitting diodes to provide a smooth transition of brightness at the pixels, preventing or reducing perceivable artifacts on the display.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
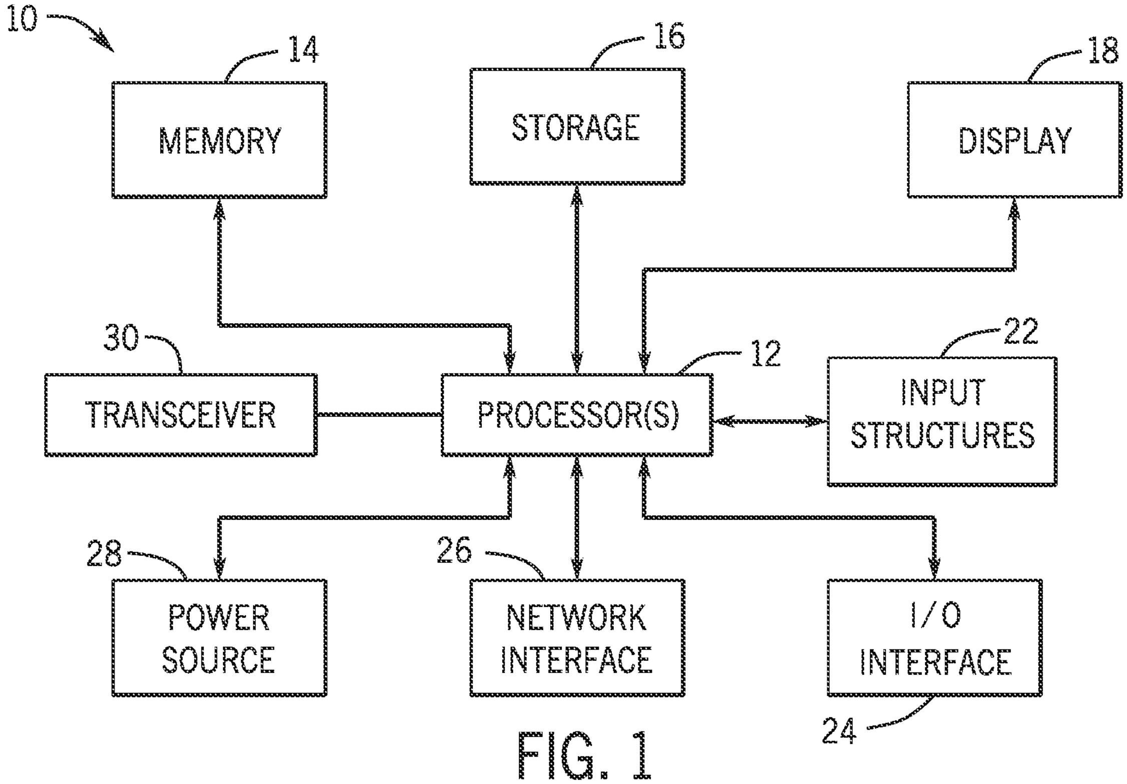
FIG. 1 is a block diagram of an electronic device, according to an embodiment of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment", "an embodiment", or "some embodiments" of the present disclosure are not intended to be interpreted as excluding the existence of additional embodiments that also incorporate the recited features. Use of the term "approximately" or "near" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

The present disclosure provides techniques for driving light emitting diodes (LED) of a pixel with peak current efficiency or approximately peak current efficiency while providing a high dynamic range for the pixel. Generally, pulse amplitude modulation (PAM), pulse width modulation (PWM), or both, may facilitate controlling light intensity for the dynamic range. Pulse amplitude modulation is a modulation technique in which the amplitude (e.g., signal strength) of the pulsed carrier signal is varied in proportion according to the amplitude of the message signal. Pulse width modulation is a modulation technique in which the width of the pulses is varied. Pulse width modulation allows varying the amount of time the signal is high (e.g., on), such as by changing the proportion of time the signal is high compared to when it is low (e.g., off) over a consistent time interval. As such, pulse width modulation reduces the average power delivered by an electrical signal by effectively breaking apart the driving time into smaller parts. Often, displays use pulse amplitude modulation to drive LEDs for a high total dynamic range. However, pulse amplitude modulation decreases efficiency of LEDs at low current, and thus, pulse amplitude modulation may render the LEDs less effective for driving for a dim luminance using the low currents. As such, displays may use a combination of both pulse amplitude modulation and pulse width modulation. However, pulse width modulation may provide a relatively lower maximum total dynamic range than the pulse amplitude modulation.

Moreover, displays are often thin film transistor (TFT) displays, which are generally a variant of a liquid crystal displays (LCDs) that use TFTs to improve image qualities such as addressability and contrast. In TFT displays, gray levels are provided using pulse amplitude modulation. However, TFTs are associated with a maximum current limitation, resulting in limited range for the total dynamic range. In LED displays, the peak current efficiencies may be the same or approximately the same as the TFT maximum currents. This may result in a shorter panel lifetime, for example, as the TFTs operate close to the maximum current limitation, as well as result in LEDs operating at low currents to avoid TFT reliability issues (e.g., LEDs operating at low efficiencies). The peak current efficiencies being the same or approximately the same as the TFT maximum currents may also result in non-uniform LED responses for low currents driving the LEDs.

As such, the systems and methods described herein disclose driving LEDs at peak current efficiencies while providing high total dynamic range for varying gray levels. With the foregoing in mind, FIG. 1 illustrates an electronic device 10 according to an embodiment of the present disclosure may include, among other things, one or more processor(s) 12, memory 14, nonvolatile storage 16, a display 18, input structures 22, an input/output (I/O) interface 24, a network interface 26, a power source 28, and a transceiver 30. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
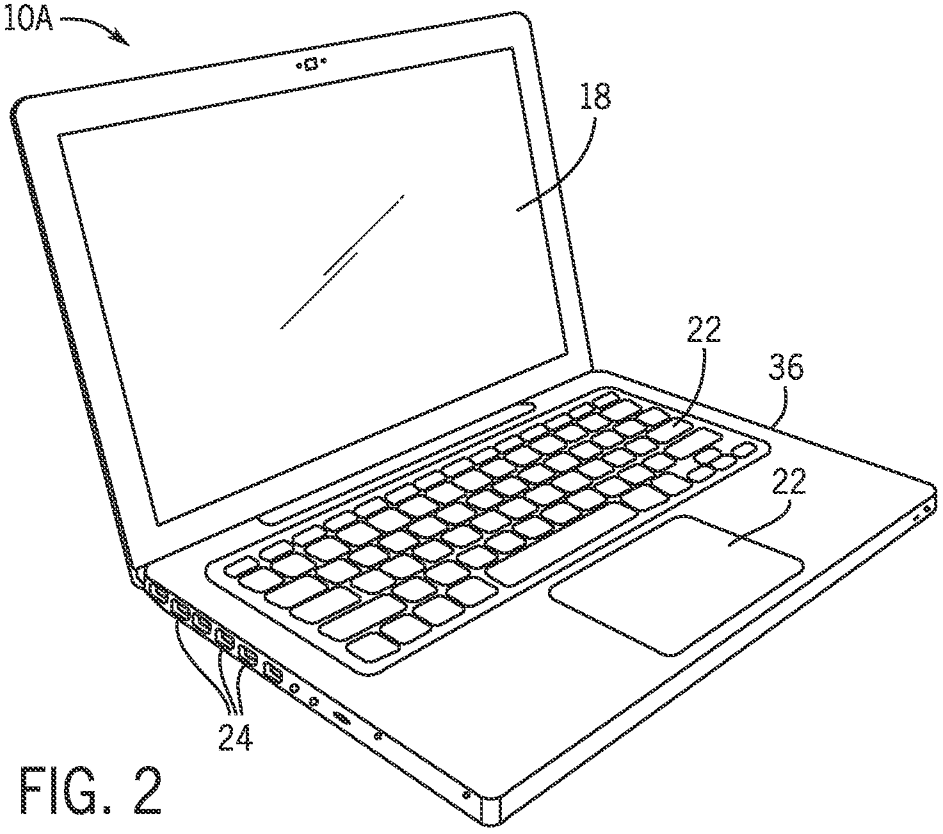
FIG. 2 is a perspective view of a notebook computer representing an embodiment of the electronic device of FIG. 1.
Figure 4:
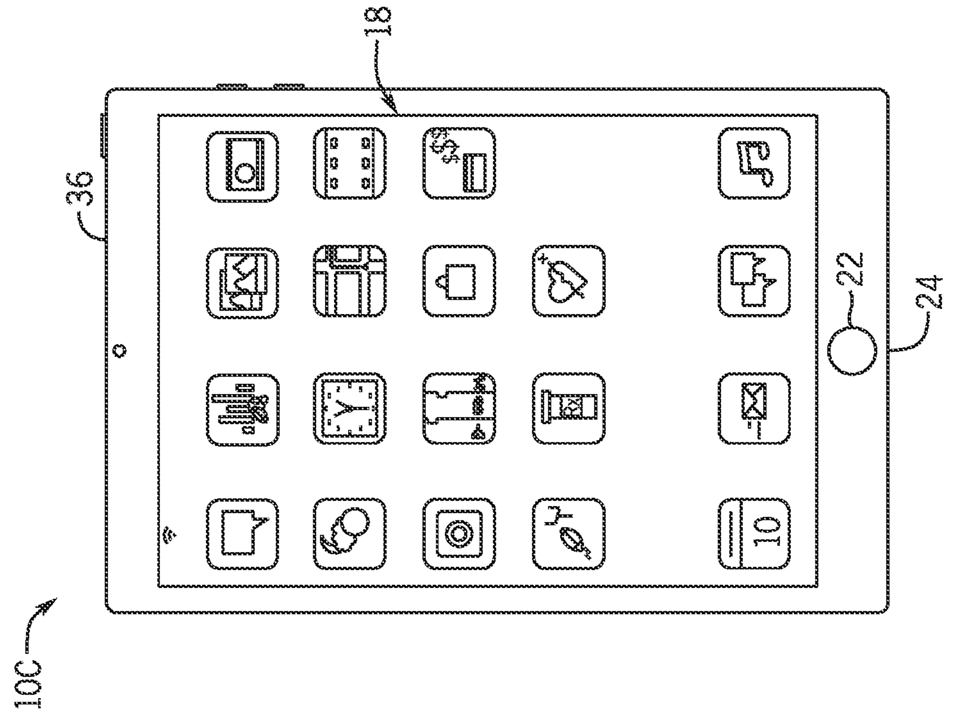
FIG. 4 is a front view of another handheld device representing another embodiment of the electronic device of FIG. 1.
Figure 3:
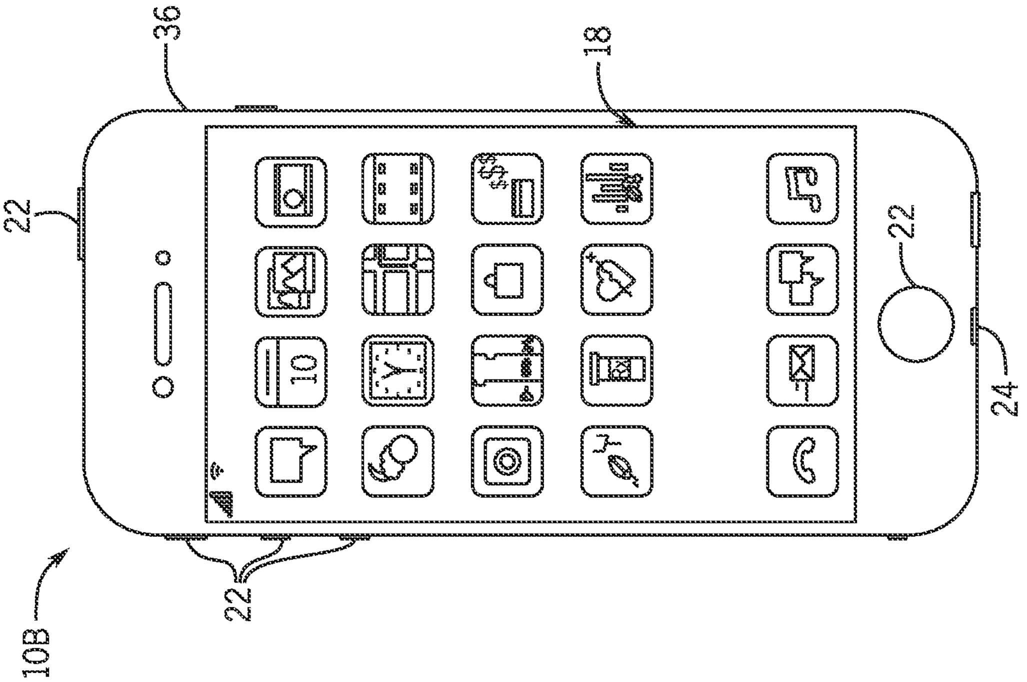
FIG. 3 is a front view of a handheld device representing another embodiment of the electronic device of FIG. 1.
Figure 5:
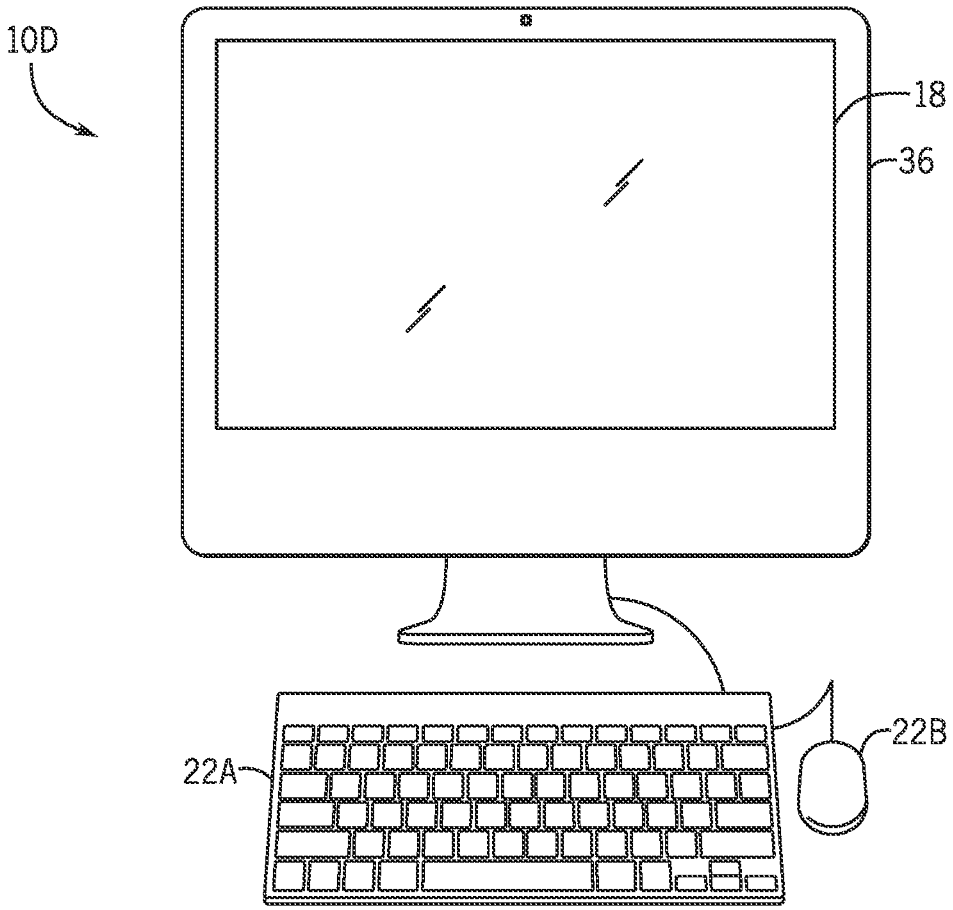
FIG. 5 is a front view of a desktop computer representing another embodiment of the electronic device of FIG. 1.
Figure 6:
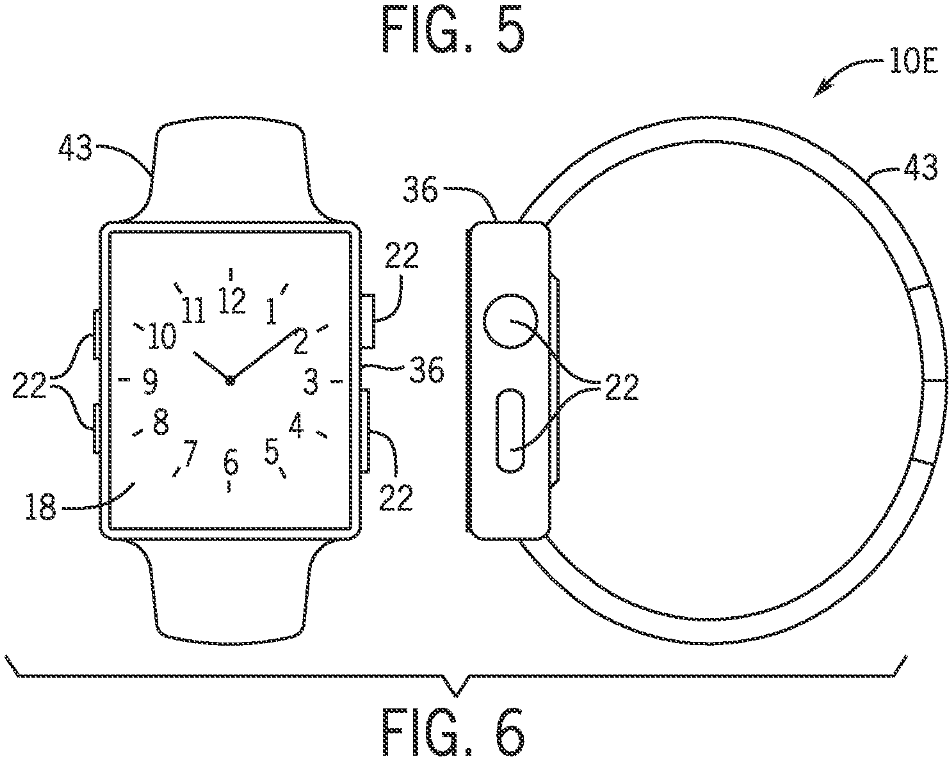
FIG. 6 is a front view and side view of a wearable electronic device representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, hardware, or any combination thereof. Furthermore, the processor(s) 12 and other related items in FIG. 1 may be a single contained processing module or may be incorporated wholly or partially within any of the other elements within the electronic device 10.

In the electronic device 10 of FIG. 1, the processor(s) 12 may be operably coupled with a memory 14 and a nonvolatile storage 16 to perform various algorithms. Such algorithms or instructions executed by the processor(s) 12 may be stored in any suitable article of manufacture that includes one or more tangible, computer-readable media. The tangible, computer-readable media may include the memory 14 and/or the nonvolatile storage 16, individually or collectively, to store the algorithms or instructions. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more light-emitting diode (LED) displays, organic light-emitting diode (OLED) displays, active-matrix organic light-emitting diode (AMOLED) displays, or some combination of these and/or other display technologies. The display 18 may drive the LEDs with amplitude modulation and/or pulse width modulation. Briefly, and as will be described in detail herein, the display 18 may include super pixels that facilitate in the LEDs operating at peak current efficiencies while providing a high dynamic range (e.g., while driving with pule width modulation).

The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interface 26. The network interface 26 may include, for example, one or more interfaces for a personal area network (PAN), such as a BLUETOOTH® network, for a local area network (LAN) or wireless local area network (WLAN), such as an 802.11x WI-FI® network, and/or for a wide area network (WAN), such as a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network. In particular, the network interface 26 may include, for example, one or more interfaces for using a Release-15 cellular communication standard of the 5G specifications that include the millimeter wave (mmWave) frequency range (e.g., 24-300 GHz). The transceiver 30 of the electronic device 10, which includes the transmitter and the receiver, may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

In some embodiments, the electronic device 10 communicates over the aforementioned wireless networks (e.g., WI-FI®, WIMAX®, mobile WIMAX®, 4G, LTE®, 5G, and so forth) using the transceiver 30. The transceiver 30 may include circuitry useful in both wirelessly receiving the reception signals at the receiver and wirelessly transmitting the transmission signals from the transmitter (e.g., data signals, wireless data signals, wireless carrier signals, radio frequency signals). Indeed, in some embodiments, the transceiver 30 may include the transmitter and the receiver combined into a single unit, or, in other embodiments, the transceiver 30 may include the transmitter separate from the receiver. The transceiver 30 may transmit and receive radio frequency signals to support voice and/or data communication in wireless applications such as, for example, PAN networks (e.g., BLUETOOTH®), WLAN networks (e.g., 802.11x WI-FI®), WAN networks (e.g., 3G, 4G, 5G, NR, and LTE® and LTE-LAA cellular networks), WIMAX® networks, mobile WIMAX® networks, ADSL and VDSL networks, DVB-T® and DVB-H® networks, UWB networks, and so forth. As further illustrated, the electronic device 10 may include the power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may be generally portable (such as laptop, notebook, and tablet computers), or generally used in one place (such as desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, California. By way of example, the electronic device 10, taking the form of a notebook computer 10A, is illustrated in FIG. 2 in accordance with one embodiment of the present disclosure. The depicted notebook computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a graphical user interface (GUI) and/or applications running on computer 10A. For example, a keyboard and/or touchpad may allow a user to navigate a user interface and/or an application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPhone® available from Apple Inc. of Cupertino, California. The handheld device 10B may include an enclosure 36 to protect interior components from physical damage and/or to shield them from electromagnetic interference. The enclosure 36 may surround the display 18. The I/O interfaces 24 may open through the enclosure 36 and may include, for example, an I/O port for a hardwired connection for charging and/or content manipulation using a standard connector and protocol, such as the Lightning connector provided by Apple Inc. of Cupertino, California, a universal serial bus (USB), or other similar connector and protocol.

The input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone that may obtain a user's voice for various voice-related features, and a speaker that may enable audio playback and/or certain phone capabilities. The input structures 22 may also include a headphone input that may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, California.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. of Cupertino, California. It should be noted that the computer 10D may also represent a personal computer (PC) by another manufacturer. A similar enclosure 36 may be provided to protect and enclose internal components of the computer 10D, such as the display 18. In certain embodiments, a user of the computer 10D may interact with the computer 10D using various peripheral input structures 22, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple Inc. of Cupertino, California. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, LED display, OLED display, active-matrix organic light emitting diode (AMOLED) display, and so forth), as well as input structures 22, which may allow users to interact with a user interface of the wearable electronic device 10E.

Figure 7:
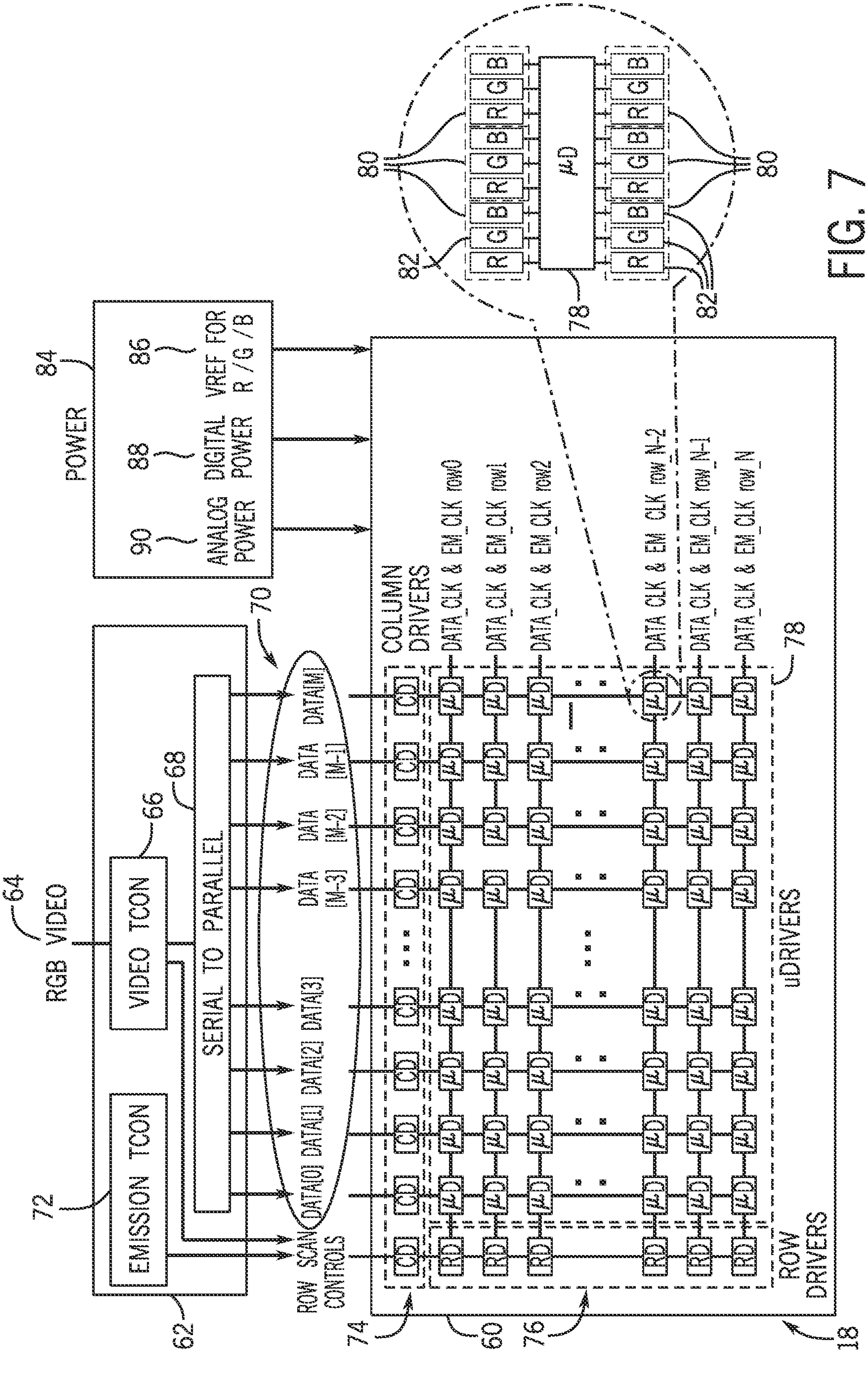
FIG. 7 is a block diagram of a μ-LED display that employs micro-drivers (μDs) to drive μ-LED sub-pixels with control signals from row drivers (RDs) and data signals from column drivers (CDs), according to embodiments of the present disclosure.

With the foregoing in mind, a block diagram of an architecture of a micro light emitting diode (μ-LED) display 18 appears in FIG. 7. Although the following descriptions describe μ-LEDs, the systems and methods described herein may apply to any LED, such as LEDs, mini LEDs, and so forth. As shown, the display 18 may use a Red Green Blue (RGB) display panel 60 with pixels, which include red, green, and blue μ-LEDs (e.g., subpixels). Support circuitry 62 may receive RGB-format video image data 64. It should be appreciated, however, that the display 18 may alternatively display other formats of image data, in which case the support circuitry 62 may receive image data of such different image format. In the support circuitry 62, a video timing controller (TCON) 66 may receive and use the image data 64 in a serial signal to determine a data clock signal (DATA_CLK) to control the provision of the image data 64 in the display 18. The video TCON 66 also passes the image data 64 to serial-to-parallel circuitry 68 that may deserialize the image data 64 signal into several parallel image data signals 70. That is, the serial-to-parallel circuitry 68 may collect the image data 64 into the particular data signals 70 that are passed on to specific columns among a total of M respective columns in the display panel 60. As such, the data 70 is labeled DATA[0], DATA[1], DATA[2], DATA[3] . . . DATA[M-3], DATA[M-2], DATA[M-1], and DATA[M]. The data 70 respectively contain image data corresponding to pixels in the first column, second column, third column, fourth column . . . fourth-to-last column, third-to-last column, second-to-last column, and last column, respectively. The data 70 may be collected into more or fewer columns depending on the number of columns that make up the display panel 60.

As noted above, the video TCON 66 may generate the data clock signal (DATA_CLK). An emission timing controller (TCON) 72 may generate an emission clock signal (EM_CLK). Collectively, these may be referred to as Row Scan Control signals. Circuitry on the display panel 60 may use the Row Scan Control signals to display the image data 70. The display panel 60 includes column drivers (CDs) 74, row drivers (RDs) 76, and micro-drivers (μDs) 78. Each μD 78 drives a number (e.g., one or more) of pixels 80 having μ-LEDs as subpixels 82. In some embodiments, each pixel 80 includes at least one red μ-LED, at least one green μ-LED, and at least one blue μ-LED to represent the image data 64 in RGB format.

A power supply 84 may provide a reference voltage ($V_{ref}$) 86 to drive the μ-LEDs, a digital power signal 88, and an analog power signal 90. In some cases, the power supply 84 may provide more than one reference voltage ($V_{ref}$) 86 signal. Namely, μ-LEDs of subpixels 82 of different colors may be driven using different reference voltages. As such, the power supply 84 may provide more than one reference voltage ($V_{ref}$) 86. Additionally or alternatively, other circuitry on the display panel 60 may step the reference voltage ($V_{ref}$) 86 up or down to obtain different reference voltages to drive different colors of μ-LEDs.

To allow the μDs 78 to drive the μ-LED subpixels 82 of the pixels 80, the column drivers (CDs) 74 and the row drivers (RDs) 76 may operate in concert. Each column driver (CD) 74 may drive the respective image data 70 signal for that column in a digital form. Meanwhile, each RD 76 may provide the data clock signal (DATA_CLK) and the emission clock signal (EM_CLK) appropriately to activate the row of μDs 78 driven by the RD 76. A row of μDs 78 may be activated when the RD 76 that controls that row sends the data clock signal (DATA_CLK). This may cause the now-activated μDs 78 of that row to receive and store the digital image data 70 signal that is driven by the column drivers (CDs) 74. The μDs 78 of that row then may drive the pixels 80 based on the stored digital image data 70 signal based on the emission clock signal (EM_CLK). That is, the μDs 78 may drive the pixels 80 for a duration corresponding to the pulse width generated by the emission clock signal (EM_CLK).

As previously mentioned, driving the LEDs (e.g., μ-LEDs) using pulse width modulation may facilitate the LEDs operating at peak efficiency current but comprise the dynamic range. As such, the LEDs of the display 18 may additionally or alternatively be driven with pulse amplitude modulation. However, pulse amplitude modulation may decrease efficiency at gray levels for dim luminesces. As will be discussed with respect to FIGS. 8-14, the super pixel described herein may facilitate the LEDs to operate at peak efficiency currents and also provide a high dynamic range.

Figure 8:
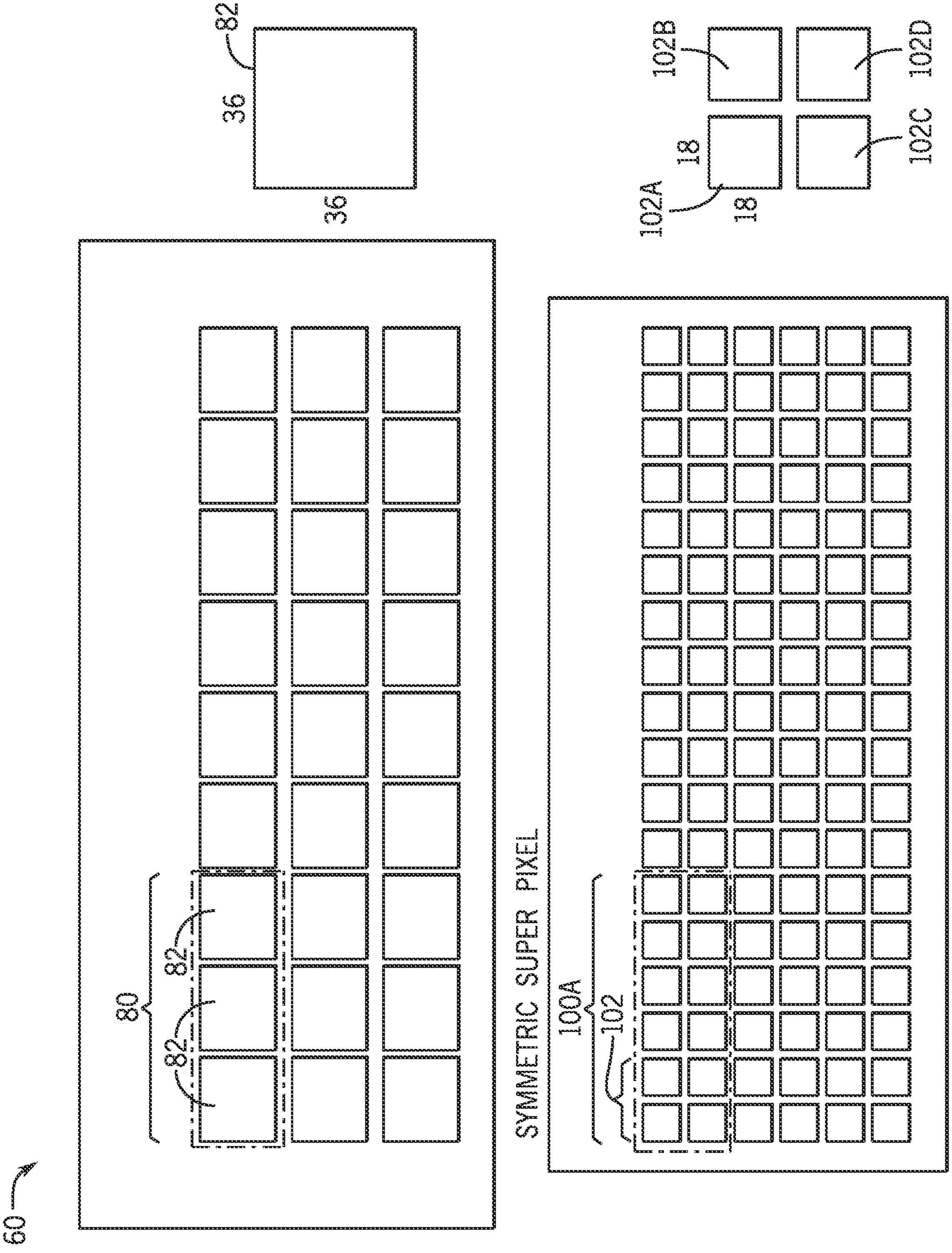
FIG. 8 is a block diagram of a symmetric super pixel, according to embodiments of the present disclosure.

To illustrate, FIG. 8 depicts a symmetric super pixel 100A of a display panel 60. In particular, a pixel 80, as previously described, may include one or more subpixels 82. In some embodiments, each of the subpixels 82 may correspond to a μ-LEDs for a different color, such as a red, green, and a blue subpixel. In the depicted embodiment, each of the subpixels 82 may include an area of 36×36 micrometers (μm). In contrast, and as shown, a pixel 80 and/or a subpixel 82 may be divided into multiple portions making up a symmetric super pixel 100A. Specifically, the symmetric super pixel 100A includes four super subpixels 102. Although the depicted embodiment and corresponding descriptions describe the symmetric super pixel 100A as having four super subpixels 102, which represents a particular embodiment, the symmetric super pixel 100 may have two or more super subpixels 102. Each of the super subpixels 102 include the same area and dimensions (e.g., length and width). That is, the super subpixels 102 are symmetric. Here, the super pixel 100A has an area of 36×36 μm and as such, each of the super subpixels 102 have an area of 18×18 μm. The super subpixels 102 having areas smaller than the subpixels 82 may facilitate control of a smaller area of the super pixel 100A and thus, more granular control overall for the super pixel 100A. That is, rather than the μDs 78 driving respective μ-LEDs for the subpixels 82 that have an area of 36×36 μm, the μDs 78 may drive smaller areas (e.g., 18×18 μm) to provide an increased and more dynamic, individual control over the brightness levels emitted by the overall LED for the super pixel 100A. For example, to reduce brightness, a first super subpixel 102A having an area of 18×18 μm may be turned off. Similarly, a second super subpixel 102B, a third super subpixel 102C, and/or a fourth super subpixel 102D may be turned off based on the desired level of brightness or dimming. Thus, the super subpixels 102 may continue to drive at the same peak current while increasing the dynamic range. In particular, the four super subpixels 102 may increase the dynamic range by a factor of four (e.g., 4×). As such, the brightness of the LEDs (e.g., μ-LEDs) of the super pixel 100 may be reduced up to a factor of four without reducing the current to the LED.

Figure 9:
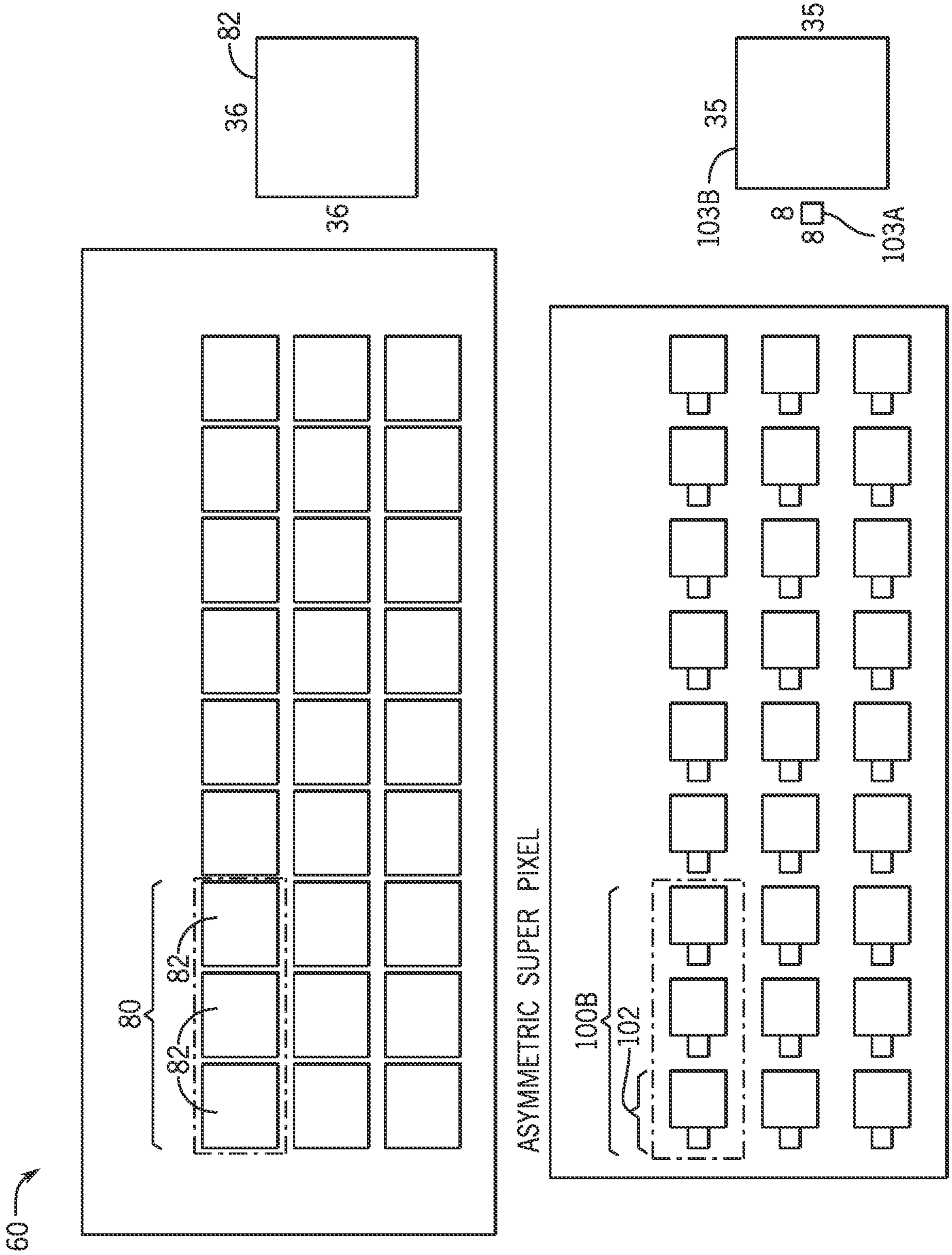
FIG. 9 is a block diagram of an asymmetric super pixel, according to embodiments of the present disclosure.

FIG. 9 depicts an asymmetric super pixel 100B of a display panel 60. As previously described, the pixel 80 may include one or more subpixels 82 that may correspond to a different colors, such as a red, a green, and a blue subpixel. The subpixels 82 may each include an area of 36×36 μm. The subpixel 82 may be divided into multiple portions making up an asymmetric super pixel 100B. Specifically, the asymmetric super pixel 100B includes two asymmetric super subpixels 102 having different areas and/or different dimensions. Although the depicted embodiment and corresponding descriptions describe the asymmetric super pixel 100B as having two super asymmetric super subpixels 103, which represents a particular embodiment, the asymmetric super pixel 100B may have two or more asymmetric super subpixels 102. Each of the asymmetric super subpixels 103 may include different areas, and thus, are symmetric. In the depicted embodiment, the super asymmetric pixel 100B has an area of 36×36 μm that is divided into two asymmetric super subpixels 103. A first asymmetric super subpixels 103A has an area of 8×8 μm and a second asymmetric super subpixel 103B has an area of 35×35 μm. As previously mentioned, the small areas of the asymmetric super subpixels 103 may facilitate granular control for the asymmetric super pixel 100B, increasing the total dynamic range. That is, rather than the μDs 78 driving respective μ-LEDs for the subpixels 82 that have an area of 36×36 μm, the μDs 78 may drive smaller areas (e.g., 35×35 μm or 8×8 μm) to provide increased and more dynamic, individual control over the brightness levels emitted by the overall LED for the asymmetric super pixel 100B.

By way of example, both of the asymmetric super subpixels 103 may be turned on for high brightness, while the larger second asymmetric super subpixel 103B may be turned off for low brightness. When both asymmetric super subpixels 103 are turned on or if either of the asymmetric super subpixels 103 are turned off, the LED (e.g., μ-LEDs) of the asymmetric super pixel 100B is still driving with a constant peak efficiency current. The dynamic range is equivalent to the ratio of the larger pixel to the smaller pixel, and as such, the dynamic range of the asymmetric super pixel 100B is $1/20^{th}$. Thus, the dynamic range is increased by a factor of 20 (e.g., 20×).

In some embodiments, the super pixels 100 may include symmetric and/or asymmetric super subpixels 102, 103, and the super subpixels 102, 103 may have different areas (e.g., different than 8×8 μm, 35×35 μm, and so forth). Furthermore, the super subpixel colors may also vary. That is, rather than the super pixel 100 including a particular number of red, green, or blue super subpixels, the super pixel 100 may include one or more or none of the red, green, or blue subpixels. The areas and symmetry of the super pixel 100 may be based on the color to be emitted and/or a desired dynamic range for the super pixel 100 or super subpixels 102, 103. For example, the dynamic range associated with red may be higher than green, and as such, may require a more granular control. As such, a red super pixel 100 may have a large number of super subpixels 102, 103 of small dimensions (e.g., smaller super subpixels 102, 103 as the number of super subpixels 102, 103 increases).

Figure 10:
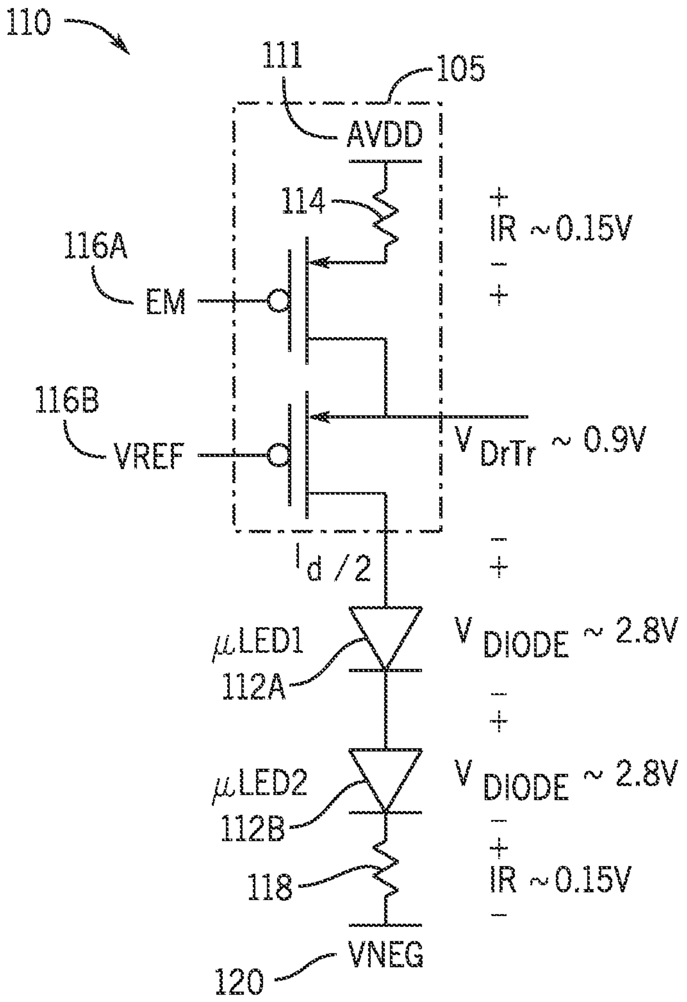
FIG. 10 is a schematic diagram of a stacked light emitting diode circuit with light emitting didoes of super pixels, according to embodiments of the present disclosure.

FIG. 10 is a schematic diagram of a stacked LED circuit 110 with a super pixel 100. As shown, the stacked LED circuit 110 includes a first LED 112A and a second LED 112B of (e.g., super pixels 100 or super subpixels 102, 103 of the super pixel 100). Although the systems and methods described herein describe two LEDs 112 corresponding to two super pixels 100, which represents a particular embodiment, the systems and methods may include two or more LEDs 112 (e.g., two, four, twenty, one hundred, and so forth). The number of LEDs 112 may be based on a desired dynamic range for the pixels 80. For example, the number of LEDs 112 may be linearly associated with the total dynamic range (e.g., increase number of LEDs 112 to increase total dynamic range). In some embodiments, the LEDs 112 may be μ-LEDs. Moreover, each of the super pixels 100 may have one or more super subpixels 102, 103 (e.g., two, three, four, eight, and so forth).

The stacked LED circuit 110 also includes an analog power supply 111 (AVDD) connected to a first resistor 114. A quotient of the AVDD 111 and the resistor 114 may provide a steady current source to a first transistor 116A and a second transistor 116B in a cascode formation. The AVDD 111, the first resistor 114, and the transistors 116 may collectively function as a current source 105, as indicated by the dashed line box. The stacked LED circuit 110 also includes a second resistor 118 connected in series with the second LED 112B, and connected to a negative voltage 120 ($V_{Neg}$). The $V_{Neg}$ 120 may receive negative voltage from a power supply and may be used to turn on the LEDs 112.

The transistors 116 may be P-channel metal—oxide—semiconductor (PMOS) transistors. An input at a gate of the first transistor 116 may include an emission signal (EM) that may enable driving circuitry for LEDs 112 to drive the LEDs 112, and an output of the first transistor 116A may include a drain voltage ($V_{DrTr}$). An input at a gate of the second transistor 116B may include a reference voltage signal ($V_{Ref}$), and output from the second transistor 116B may include current for the LEDs 112 (e.g., diode current). As previously discussed, the $V_{Ref}$ may refer to a reference voltage to drive the LEDs 112.

The first LED 112A and the second LED 112B are connected in series and since they illuminate at the same time, the brightness for the super pixel 100 may be doubled. As such, the current source 105 may drive the LEDs 112 with half the amount of current to reduce the brightness back to the intended level of brightness. By reducing the driving current to half, the stacked LED circuit 110 may reduce power consumption. The power overhead resulting from the transistors 116 using some power intended for the LEDs 112, may also result in a voltage drop due across a resistance (e.g., an IR drop) as a product of current (I) passing through resistance (R), such as through the first resistor 114 and/or the second resistor 118. By reducing the driving current to half, the stacked LED circuit 110 may also reduce the IR drop across the first resistor 114 and/or the second resistor 118. By way of example, the stacked LED circuit 110 may reduce power consumption by at least 25% in comparison to a cascode current source with a single LED 112 or the LEDs 112 not connected in series (e.g., in parallel).

The LEDs 112 may be two different LEDs 112 (e.g., μ-LEDs) corresponding to two different super subpixels 102, 103 of a super pixel 100, such as a symmetric super pixel 100A and/or an asymmetric super pixel 100B. In some embodiments, the LEDs 112 may be two different LEDs 112 corresponding to two super pixels 100, such as a symmetric super pixel 100A and/or an asymmetric super pixel 100B having super subpixels 102, 103.

The LEDs 112 may be turned off one by one to decrease brightness. Moreover, the LEDs 112 may have different maximum current densities (Jmax) and as such, if one of the LEDs 112 becomes inefficient (e.g., current efficiency below a threshold efficiency), the other LED 112 may compensate. That is, the inefficient LED 112 may be turned off and the efficient LED 112 may emit light at a higher level so that the brightness is constant. To vary the brightness, symmetric super subpixels 102 and/or the asymmetric super subpixels 103 of the super pixels 100 may be used, along with the output blending techniques described herein.

Figure 11:
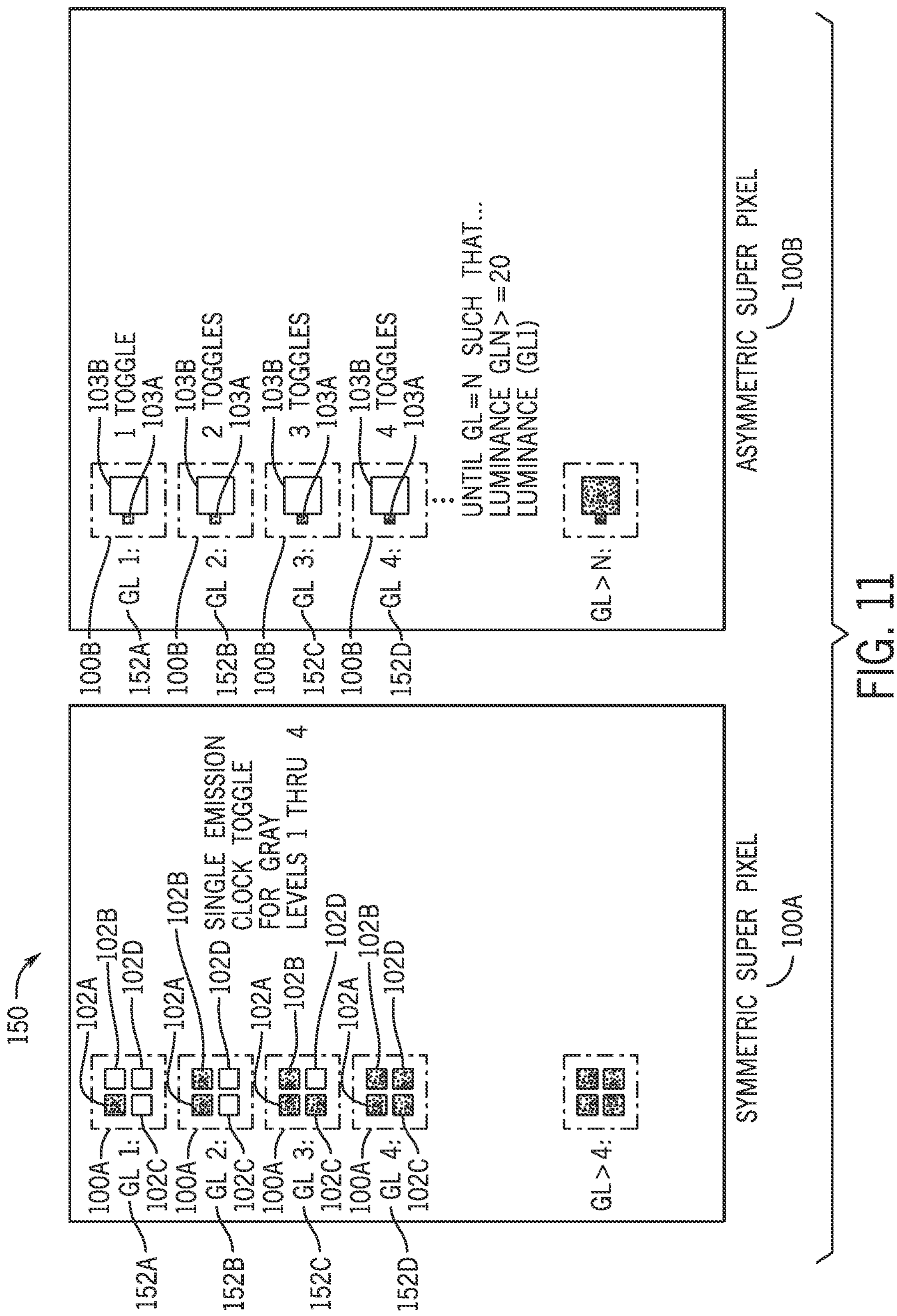
FIG. 11 is a flow diagram of a data flow for driving the symmetric super pixel and the asymmetric super pixel based on a gray level, according to embodiments of the present disclosure.

To illustrate, FIG. 11 is a block diagram 150 for driving an LED 112 for the symmetric super pixel 100A and for the asymmetric super pixel 100B (e.g., μ-LEDs for the super subpixels 102, 103) based on a gray level 152. Any suitable device that may control the electronic device 10 and/or the circuitry of the display 18, such as the processor 12 (e.g., one or more processors), may perform the processes described herein (e.g., with respect to FIG. 8-14), such as turning on (e.g., to emit light) or turning off (e.g., to stop emitting light) one or more LEDs 112 and/or μ-LEDs for the super pixels 100 or super subpixels 102, 103. The processes may be implemented by executing software or instructions stored in a tangible, non-transitory, computer-readable medium, such as the memory 14 (e.g., one or more memory devices), using the processors 12. The processor 12 of the electronic device 10 may execute instructions to perform the processes that are stored in the memory 14 and carried out by the processor 12. In some embodiments, display driving circuitry may perform the processes described herein. For example, the display driving circuitry may perform the process steps described in FIG. 11 and FIG. 12. While the processes may be described using steps in a specific sequence (e.g., turning on a first super subpixel 102A, 103A and subsequently a second super subpixel 102B, 103B), it should be understood that the present disclosure contemplates that the described steps may be performed in different sequences than the sequence illustrated, and certain described steps may be skipped or not performed altogether.

As shown, the super pixels 100 may emit light for more than four gray levels 152. In additional or alternative embodiments, the super pixels 100 may emit light for one or more gray levels 152. For a first gray level 152A, which is the lowest gray level (e.g., dimmest luminance) in the current embodiment, the first symmetric super subpixel 102A may be turned on while the remaining symmetric super subpixels 102 are turned off. For a second gray level 152B, which is the second lowest gray level (e.g., second dimmest luminance) in the current embodiment, the first and the second symmetric super subpixels 102A, 102B may be turned on while the remaining symmetric super subpixels 102 are turned off. For a third gray level 152C, which is the third lowest gray level (e.g., moderate luminance) in the current embodiment, the first through the third symmetric super subpixels 102A-C may be turned on while the fourth symmetric super subpixel 102D is turned off. Each of four gray levels 152 may be associated with a single emission clock toggle (e.g., via the first transistor 116A) for driving the μDs 78 driving the LEDs 112 for the symmetric pixel 100A or μ-LEDs for the respective super subpixels 102. After four or more gray levels, all the μ-LEDs of the subpixels 102 may emit light and additional toggles may be used for additional luminance (e.g., up to 252 toggles of the emission clock).

Similarly, for the asymmetric super pixel 100B, the first asymmetric super subpixel 103B may be turned on while the second asymmetric super subpixel 103B is turned off. For the second, third, and fourth gray levels 152B-D and up to N (e.g., one or more, such as four) gray levels, the luminance is increased by a factor of 20 and the emission clock may be toggled to increase brightness for the first asymmetric super subpixel 103A. As previously discussed, the asymmetric super pixel 100B provides a dynamic range of 20. After the luminance reaches a factor of 20 (e.g., 20 luminance), the second asymmetric super subpixel 103B may be turned on. For additional brightness for higher gray levels 152, pulse width modulation may be used and the emission clock may be toggled, up to 255 toggles. In some embodiments, pulse amplitude modulation may be used.

Figure 12:
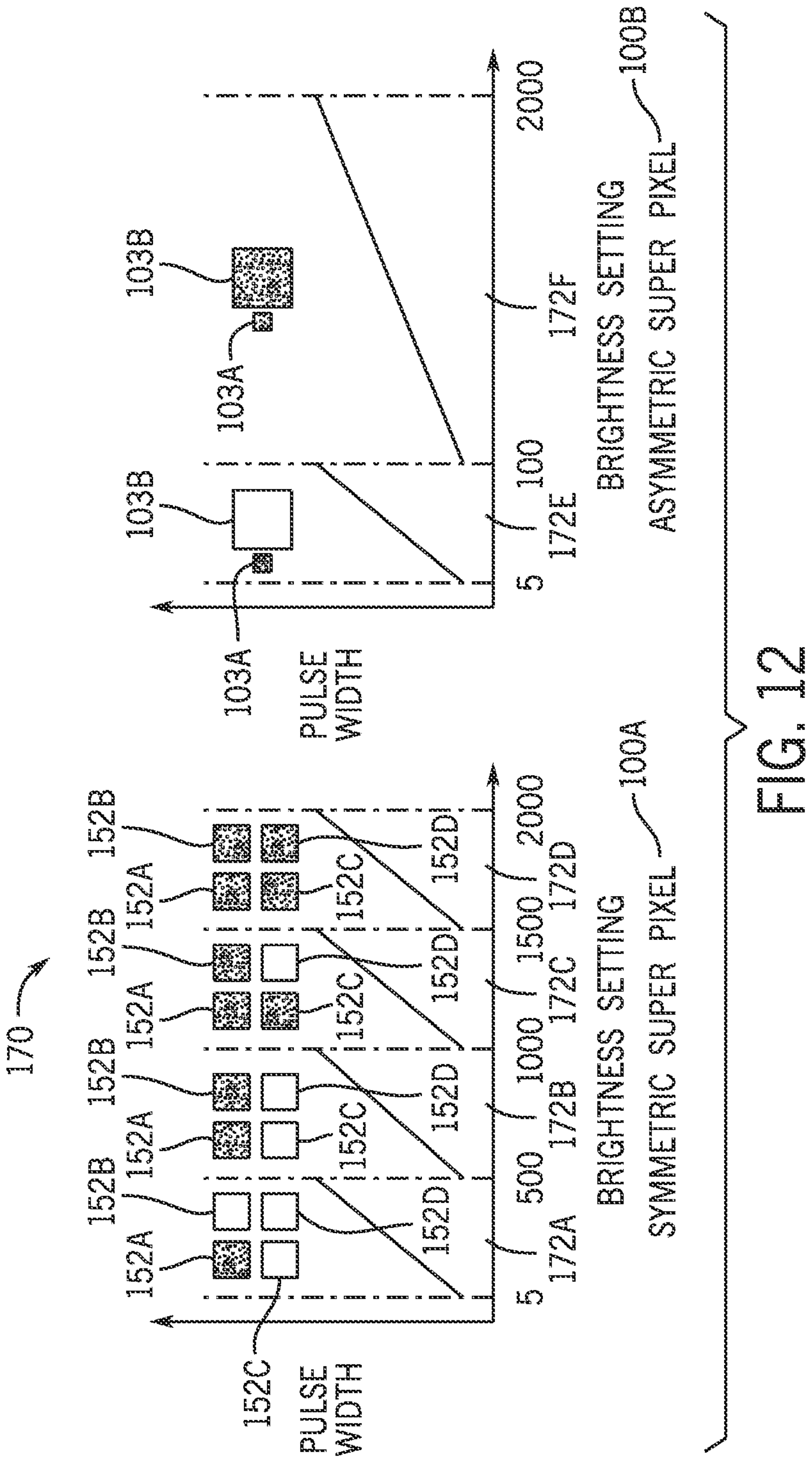
FIG. 12 is a flow diagram of a data flow for driving light emitting diodes of the symmetric super pixel and the asymmetric super pixel based on a brightness setting, according to embodiments of the present disclosure.

FIG. 12 is a block diagram 170 for driving an LED 112 for the symmetric super pixel 100A and for the asymmetric super pixel 100B (e.g., μ-LED for the super subpixels 102, 103) based on a brightness setting 172 (e.g., 5 to 2000 nits). As shown, the super pixels 100 may emit light for varying brightness settings. In the depicted embodiment, a first brightness setting 172A, which includes a range of 5 to 500 nits, the first symmetric super subpixel 102A may be turned on while the remaining symmetric super subpixels 102 are turned off. For a second brightness setting 172B, which includes a range of 500 to 1000 nits, the first and the second symmetric super subpixels 102A, 102B may be turned on while the remaining symmetric super subpixels 102 are turned off. For a third brightness setting 172C, which includes a range of 1000 to 1500 nits, the first through the third symmetric super subpixels 102A-C may be turned on while the fourth symmetric super subpixel 102D is turned off. For a fourth brightness setting 172D, which includes a range of 1500 to 2000 nits, each of the symmetric super subpixels 102 may be turned on.

For the asymmetric super pixel 100B, a fifth brightness setting 172E, which includes a range of 5 to 100 nits, the first asymmetric super subpixel 103A may be turned on while the second asymmetric super subpixel 103B is turned off. During a sixth brightness setting 172F, which includes a range of 100 to 2000 nits, the first and the second asymmetric super subpixels 103A and 103B may be turned on. Generally, the brightness settings 172 may correspond to the dynamic range associated with the super pixels 100 and the dimensions of the respective super subpixels 102, 103. For example, if the maximum brightness emitted by the super pixels 100 is 2000, the brightness setting ranges 172 may correspond to the dynamic range provided by each of the super subpixels 102, 103. By way of example, for the asymmetric super pixel 100B, the brightness setting range may be based on a factor of 20 when the dynamic range is 20. That is, the sixth brightness setting 172F has a range that is greater by a factor of 20 (e.g., range of 100 to 2000 is 20 times larger than a range of 5 to 100).

Generally, when switching between LEDs 112 (e.g., μ-LEDs turning on super subpixels 102, 103), the change in luminance may create perceivable artifacts on the display 18. For example, when changing the luminance based on gray levels 152, as described with respect to FIG. 11, the gray level 152 at which the LEDs 112 switched may create a perceivable step in an otherwise smooth gray level transition or ramp. Similarly, when changing the luminance provided by the LEDs 112 based on the brightness setting 172, an abrupt jump in brightness may occur when increasing the brightness. The significant variance in brightness may also result in perceivable artifacts on the display 18. To prevent or reduce the artifacts, the LEDs 112 may be controlled to vary the luminance gradually. That is, a first LED 112A may be turned off and a second LED 112B may be turned on, or the first LED 112A may remain turned on when the second LED 112B is turned on, using light blending techniques applied to the stacked LED circuit 110.

Figure 13:
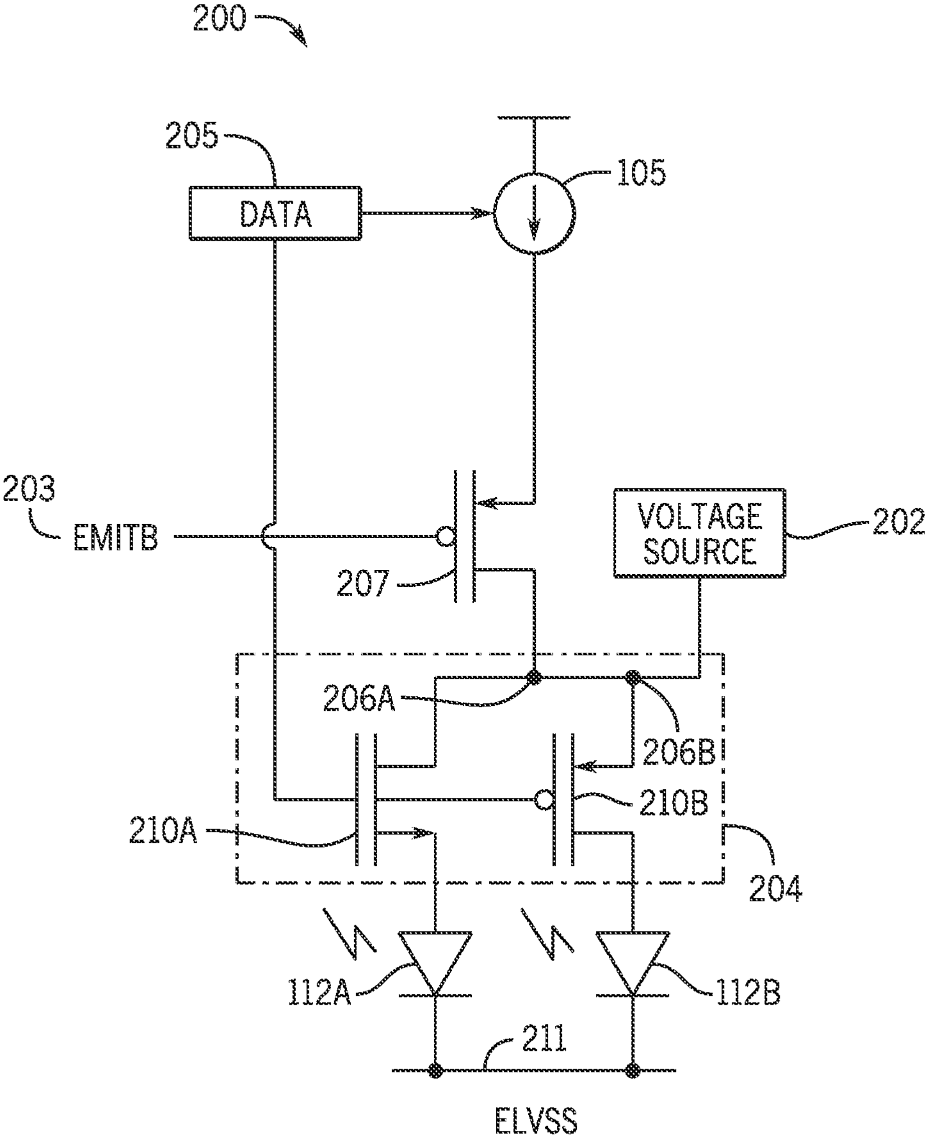
FIG. 13 is schematic diagram of the stacked light emitting diode circuit using light emitting diodes in parallel, according to embodiments of the present disclosure.

FIG. 13 is schematic diagram of the stacked LED circuit 200 with LEDs 112 in parallel for the super pixels 100 (e.g., μ-LEDs of super subpixels 102, 103). The depicted circuit may facilitate light blending, which may refer to a blending of the outputs from the LEDs 112. In particular, the stacked LED circuit 200 with LEDs 112 in parallel may be used when blending between LEDs 112 for a change in luminance based on gray levels 152. As will be described herein, the gates of two complementary TFTs may be connected to a data storage capacitor, while W/L ratios are selected based on a blending point. This stacked LED circuit 200 with LEDs 112 in parallel may cause current to flow towards either of the TFTs controlling a first LED 112, the second LED 112, or both, based on the particular gray level. The current flow may effectively blend outputs of the LEDs 112.

As shown, the circuit 200 includes the current source 105, a voltage source 202, an emit signal 203 (EMITB), a blending circuit 204, a data source 205, a current control transistor 207, the first LED 112A, the second LED 112B, and a negative power supply 211. The data source 205 may include data indicating and/or controlling the amount of current from the current source 105 to provide to the blending circuit 204, which drives the LEDs 112 for a particular gray level. In particular, the current source 105 may input current to the current control transistor 207 based on the data source 205 and the emit signal 203 may control (e.g., enable or block) the amount of current outputted from the current control transistor 207 to the blending circuit 204. The current source 105 may provide a calibrated current source for driving the LEDs 112. That is, the current source 105 may provide a constant current source to the LEDs 112. The voltage source 202 may pre-charge the LEDs 112. Specifically, the LEDs 112 may be initially driven with the voltage source 202 until they are stabilized or reach an operating voltage. At this point, the LEDs 112 may be switched to being driven by the current source 105.

As shown, the LEDs 112 are connected in parallel. At a first node 206A, the first LED 112A may connect to the voltage source 202 and at a second node 206B, the second LED 112B may connect to the voltage source 202. When the LEDs 112 are switched to being driven by the current source 105, the provided current may evenly or approximately evenly split between the first LED 112A and the second LED 112B (e.g., half to the first LED 112A and half to the second LED 112B). That amount of current may vary based on the subpixels 102, 103.

In particular, a first light blending transistor 210A and a second light blending transistor 210B may be selectively enabled to control the amount of current passing through to each of the respective first LED 112 and the second LED 112B, such as by selecting the voltage across the light blending transistors 210. The light blending transistors 210 may be complementary, in which the first light blending transistors 210A is a P-type metal-oxide-semiconductor (PMOS) transistor and the second light blending transistor 210B switch is an N-type metal-oxide-semiconductor (NMOS) transistor. The NMOS second light blending transistors 210B may turn off as a gate voltage of the NMOS second light blending transistor 210B decreases. On the other hand, the PMOS first light blending transistors 210A may turn on as a gate voltage of the PMOS first light blending transistor 210A decreases since the PMOS first light blending transistor 210A receives negative voltage from a negative power supply 211 (ELVSS), further driving the PMOS first light blending transistor 210A to turn on. As such, the higher the absolute magnitude of the voltage stored in capacitors for charging the LEDs 112, the lower the gate voltage becomes, causing the second light blending transistor 210B to turn off. As a result, the current may be provided to the second light blending transistor 210B and the second LED 112B.

A relatively higher gate voltage may cause the current to be provided to the first light blending transistor 210A and the first LED 112A. Thus, that amount of brightness to be emitted by the LEDs 112 and the super pixels 100 (e.g., the subpixels 102, 103) may be controlled using the first light blending transistor 210A and the second light blending transistor 210B. Light blending via the first light blending transistor 210A and the second light blending transistor 210B may determine how much current goes to the first light blending transistor 210A and the first LED 112A and the second light blending transistor 210B and the second LED 112B.

That is, the first LED 112A and the second LED 112B may be turned on at different times. Turning them on and off may be controlled for blending to provide a smooth transition, rather than turning them on in response to another LED 112 turning off. Furthermore, as previously mentioned, the current going into the LED 112 may not change (e.g., Jmax is constant) while blending. Instead, the amount of current going to the first light blending transistor 210A or the second light blending transistor 210B may vary, and the brightness emitted at the super pixels 100 may be controlled by reducing the maximum current density (Jmax).

Figure 14:
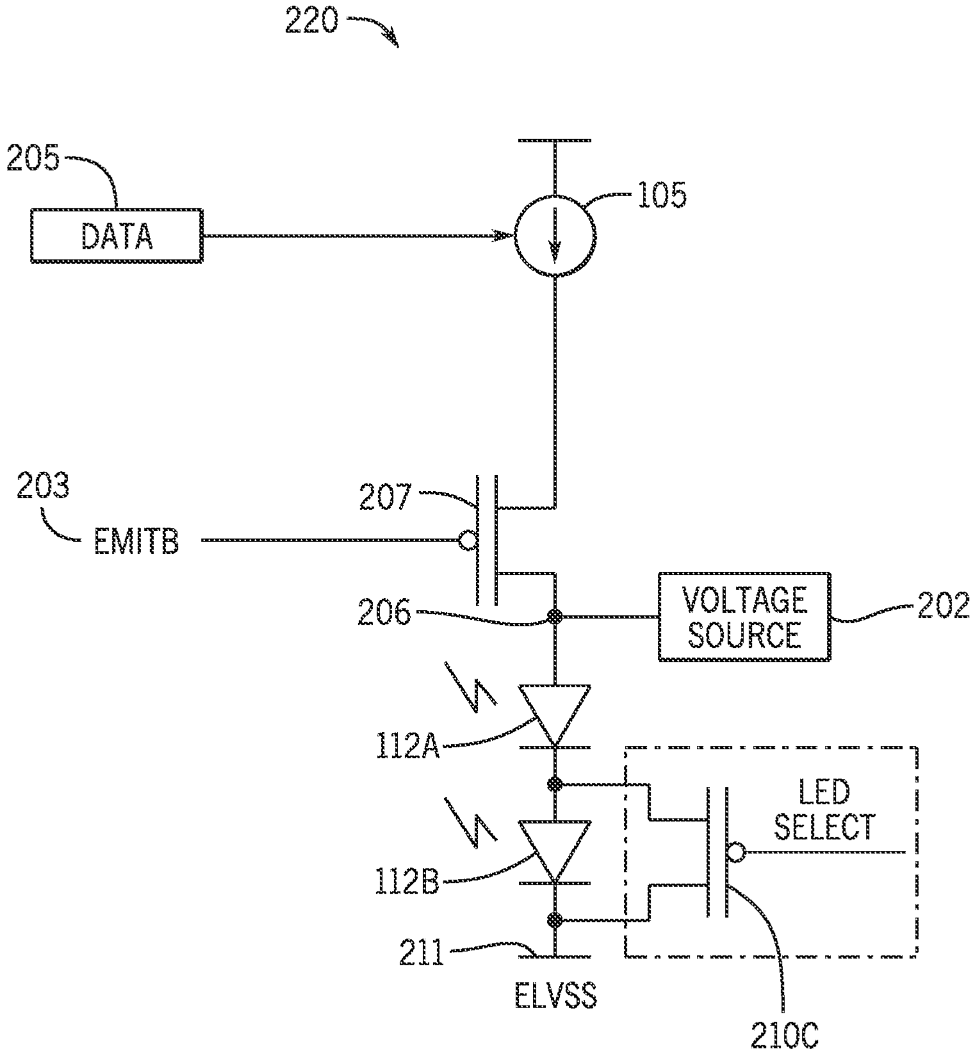
FIG. 14 is schematic diagram of the stacked light emitting diode circuit using light emitting diodes in series, according to embodiments of the present disclosure.

FIG. 14 is schematic diagram of the stacked LED circuit 220 with LEDs 112 in series for the super pixels 100 (e.g., μ-LEDs of super subpixels 102, 103). This stacked LED circuit 220 with LEDs 112 in series may be used when blending between LEDs 112 based on the brightness setting 172. In particular, a source and drain of a TFT may be connected across an LED 112, such as the large second asymmetric super pixel 103B, and a gate of the TFT may connect an external line that controls the amount of current removed from the large second asymmetric super pixel 103B. Controlling the amount of current removed may be modulated to blend the outputs of the LEDs 112 together based on the desired brightness level. In some embodiments, the stacked LED circuit 200 and 220 discussed with respect to FIG. 13 and FIG. 14, may be combined to create light blending for gray levels 152 and brightness settings 172.

As shown, the circuit 220 may include the same components as FIG. 13, such as the current source 105, the voltage source 202, the emit signal 203 (EMITB), the data source 205, the current control transistor 207, the first LED 112A, the second LED 112B, and the negative power supply 211. These components may operate as described with respect to FIG. 13. For example, the LEDs 112 may be driven by the current source 105 via the emit signal 203, or the voltage source 202. As shown, the circuit 220 includes the LEDs 112 in series. The circuit 220 also includes a third transistor 210C that is configurable to select the first LED 112 and/or the second LED 112B.

The current source 105 may provide the constant current source, as previously discussed. However, the current going to each the LEDs 112 (e.g., μ-LEDs) may vary, such as to control the subpixels 102, 103. As previously mentioned, the third light blending transistor 210C may select the first LED 112 and/or the second LED 112 by functioning as a bypass switch. As such, when the third light blending transistor 210C is turned on, current from the current source 105 may be shunted (e.g., directed) from going into the LED 112. Shunting the current may result in the LED 112 receiving less current and thus, may the light emitting from the LED 112 may be dimmer. Generally, the light blending transistors 210 do not have to be entirely on or off (e.g., operate as an on or off switch). They can be in an intermediate mode of a switch (e.g., partially on or partially off), in which some of the current may pass through the light blending transistors 210 and some will go through the LED 112 (e.g., so the LEDs 112 are not fully on or off). Thus, the systems and methods described herein disclose driving LEDs at peak current efficiencies while providing high total dynamic range for varying gray levels and/or brightness settings.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A display system of a display, comprising:

a first light emitting diode configured to emit light;

a second light emitting diode configured to emit light;

a current source configured to provide a constant current to the first light emitting diode and the second light emitting diode based on a data signal; and a plurality of transistors configured to receive the data signal, wherein the transistors of the plurality of transistors are configured to adjust an amount of the current or shunt the current towards the first light emitting diode, the second light emitting diode, or both based on the data signal.

2. The display system of claim 1, wherein adjusting the amount of current towards the first light emitting diode, the second light emitting diode, or both, blends outputs of the first light emitting diode and the second light emitting diode.

3. The display system of claim 1, wherein the first light emitting diode and the second light emitting diode are connected in series.

4. The display system of claim 3, wherein a transistor of the plurality of transistors removes current from the second light emitting diode connected in series with the first light emitting diode, and wherein the second light emitting diode comprises a larger area than the first light emitting diode.

5. The display system of claim 1, wherein adjusting the amount of causes the first light emitting diode, the second light emitting diode, or both, to be partially on or partially off.

6. The display system of claim 1, wherein adjusting the amount of provides different amounts of current towards the first light emitting diode and the second light emitting diode.

7. The display system of claim 6, wherein the current from the current source remains constant when a transistor of the plurality of transistors removes or shunts the current to the first light emitting diode and the second light emitting diode.

8. The display system of claim 1, wherein the first light emitting diode and the second light emitting diode are connected in parallel.

9. The display system of claim 8, wherein or shunt adjusting the amount of the current towards the first light emitting diode and the second light emitting diode connected in parallel is based at least on a gray level.

10. The display system of claim 1, wherein or shunt adjusting the amount of the current towards the first light emitting diode and the second light emitting diode connected in series is based at least on a brightness setting.

11. The display system of claim 1, wherein the plurality of transistors comprises of a first transistor that is a P-type transistor and a second transistor that is a N-type transistor.

* * * * *